(12) United States Patent
Folea et al.

(10) Patent No.: US 8,861,729 B2
(45) Date of Patent: Oct. 14, 2014

(54) METHOD AND SYSTEM FOR THE SECURE DISTRIBUTION OF AUDIOVISUAL DATA BY TRANSACTIONAL MARKING

(75) Inventors: Octavian Folea, München (DE); Didier Lesteven, Draveil (FR)

(73) Assignee: Nagra France SAS (FR)

( * ) Notice: Subject to any disclaimer, the term of this patent is extended or adjusted under 35 U.S.C. 154(b) by 574 days.

(21) Appl. No.: 12/771,474

(22) Filed: Apr. 30, 2010

(65) Prior Publication Data
US 2010/0208891 A1 Aug. 19, 2010

Related U.S. Application Data

(63) Continuation-in-part of application No. PCT/FR2008/001531, filed on Oct. 30, 2008.

(30) Foreign Application Priority Data

Oct. 30, 2007 (FR) ...................................... 0707634

(51) Int. Cl.
| | |
|---|---|
| H04N 7/167 | (2011.01) |
| H04N 21/8358 | (2011.01) |
| H04N 21/4627 | (2011.01) |
| H04N 21/2343 | (2011.01) |
| H04N 21/4405 | (2011.01) |
| H04N 21/41 | (2011.01) |
| H04N 21/63 | (2011.01) |

(52) U.S. Cl.
CPC ......... *H04N 7/1675* (2013.01); *H04N 21/8358* (2013.01); *H04N 21/4627* (2013.01); *H04N 21/234345* (2013.01); *H04N 21/44055* (2013.01); *H04N 21/4135* (2013.01); *H04N 21/631* (2013.01)
USPC ....................................................... 380/205

(58) Field of Classification Search
USPC ........ 380/200–209, 210; 725/86, 87; 713/176
See application file for complete search history.

(56) References Cited

U.S. PATENT DOCUMENTS

| | | | | |
|---|---|---|---|---|
| 7,047,412 | B2 * | 5/2006 | Echizen et al. ................ | 713/176 |
| 7,639,833 | B2 * | 12/2009 | LeComte et al. ............. | 382/100 |

(Continued)

FOREIGN PATENT DOCUMENTS

| | | |
|---|---|---|
| WO | 99/65241 A1 | 12/1999 |
| WO | WO 2004/015996 A2 | 2/2004 |
| WO | WO 2004/062281 A2 | 7/2004 |

OTHER PUBLICATIONS

Paul Judge and Mostafa Ammar, Whim: Watermarking multicast video with a hierarchy of intermediaries, 10 th International Workshop on Network and Operation System Support for Digital Audio. 2000.*

(Continued)

*Primary Examiner* — Beemnet Dada
(74) *Attorney, Agent, or Firm* — DLA Piper LLP (US)

(57) ABSTRACT

A process for distributing a marked audiovisual sequence from a nominal audiovisual sequence towards a receiver, said nominal audiovisual sequence having a nominal content, comprising: generating a marked audiovisual sequence according to a first mark applied to initial content at marking positions; generating a modified stream having a modified content different from the nominal content at least at marking positions; generating a complementary stream so that it is possible to reconstitute the marked audiovisual sequence from the modified stream; and transmitting the modified stream and the complementary stream towards the receiver wherein, on the receiver, a reconstitution of the audiovisual sequence, comprises calculating new complementary data according to the marking positions and the complementary stream so that it is possible to create an audiovisual sequence marked with a second mark from the modified stream, wherein the second mark, being different from the first mark, is applied to the initial content at the marking position.

16 Claims, 5 Drawing Sheets

(56) References Cited

U.S. PATENT DOCUMENTS

| | | | |
|---|---|---|---|
| 7,689,823 B2 * | 3/2010 | Shen et al. | 713/153 |
| 7,764,791 B2 * | 7/2010 | LeComte | 380/210 |
| 8,094,876 B2 * | 1/2012 | Lecomte et al. | 382/100 |
| 8,229,117 B2 * | 7/2012 | Lecomte et al. | 380/239 |
| 2005/0154892 A1 * | 7/2005 | Mihcak et al. | 713/176 |
| 2005/0289064 A1 | 12/2005 | LeComte et al. | |
| 2006/0075244 A1 * | 4/2006 | Schumann et al. | 713/176 |

OTHER PUBLICATIONS

Carsten Griwodz, Oliver Merkerl, Jana Dittmann and Ralf Steinmetz, "Protecting VoD the Easier Way," XP-000977484, 1998, ACM Multimedia '98, Bristol, UK, pp. 21-28.

* cited by examiner

METHOD AND SYSTEM FOR THE SECURE DISTRIBUTION OF AUDIOVISUAL DATA BY TRANSACTIONAL MARKING

RELATED APPLICATIONS

This application is a continuation-in-part application of PCT Application No. PCT/FR2008/001531, filed Oct. 30, 2008 which claims priority from French Application No. 07 07634, filed Oct. 30, 2007, the entire contents of which are incorporated by reference.

This disclosure refers to a process for the distribution of audiovisual sequences.

BACKGROUND

In order to protect an audiovisual sequence against piracy, it is known to watermark the audiovisual sequence, visibly or invisibly, so as to identify the owner of a pirate copy.

It is also known to encode the audiovisual sequence during a transmission in order to prevent the illicit reading of the sequence.

It is certainly possible to combine these two protection processes, by encoding the audiovisual sequence at an encryption module on the transmitter side, and by watermarking the sequence after the decryption at a watermarking module on the receiver side.

However, such a process would not prevent a fraudster from recovering the sequence at the exit of the decryption module before passing to the level of the watermarking module.

Such a fraudster could then freely use the not watermarked audiovisual sequence, if he succeeded in deciphering the sequence.

In order to solve this general problem, a process for the distribution of a marked audiovisual sequence from a nominal audiovisual sequence towards a receiver equipment is known, said nominal audiovisual sequence having a nominal content, the process comprising steps in which:
  a first mark is generated capable of being applied to the initial content at marking positions;
  a modified stream is generated having a modified content different from said nominal content;
  a complementary stream is generated comprising calculated complementary data so that it is possible to reconstitute an altered audiovisual sequence from said modified stream according to said complementary data,
  said modified stream and said complementary stream are transmitted towards said receiver equipment.

Such a process is known from the application WO 2004/062281.

In one embodiment of this application, the complementary stream includes marking instructions in order to insert an invisible and personalized mark into the marked audiovisual sequence.

In a preferred embodiment of the application WO 2004/062281, these instructions in particular allow to invert the LSB of certain visual coefficients, such as the DC coefficients.

The absence or not of an inversion on a LSB will allow, during an identification step, to determine the first mark inserted into the audiovisual sequence.

These instructions being inserted in the complementary stream, a fraudster could not have access to the audiovisual content before the application of the marking instructions, and thus before the insertion of the first personalized mark.

However, such a process does not allow an effective protection during a broadcast to receiver facilities.

Indeed, in broadcasting, the data transmitted to different receivers are identical for all the receivers.

Hence, if one applied the process described in the embodiment of the application WO 2004/062281 previously described, the marking instructions contained in the complementary stream would be identical for all the receivers and thus it would not be possible to distinguish pirate copies.

At the light of the aforementioned document, a problem that the invention sets out to solve is to allow a personalized marking of the audiovisual sequence distributed by broadcasting.

It could therefore be helpful to provide a process such as previously described in which:
  one calculates said complementary data according to said marking positions;
  one generates, on the receiver equipment, a second mark different from the first mark and
  one reconstitutes said audiovisual sequence marked by the second mark at said marking positions from said modified stream according to said complementary data.

SUMMARY

The invention thus refers to a process for the distribution of a marked audiovisual sequence from a nominal audiovisual sequence towards a receiver equipment, said nominal audiovisual sequence having a nominal content,
the process comprising steps in which:
  a first mark is generated capable of being applied to the initial content at marking positions;
  a modified stream is generated having a modified content different from said nominal content;
  a complementary stream is generated comprising calculated complementary data so that it is possible to reconstitute an altered audiovisual sequence from said modified stream according to said complementary data, said modified stream and said complementary stream are transmitted towards said receiver equipment;
in which
  said complementary data are calculated according to said marking positions;
  one generates, on the receiver equipment, a second mark different from the first mark and
  one reconstitutes said audiovisual sequence marked by the second mark at said marking positions from said modified stream according to said complementary data.

In order to be able to distribute in a secure way audiovisual sequences marked with a personalized mark towards a plurality of receiver facilities using one of the broadcasting distribution means, the person skilled in the art knows techniques which prompt him to conceive two main solutions.

The first solution would be to generate a plurality of audiovisual sequences marked with a personalized mark for each receiver equipment and to send this plurality of marked audiovisual sequences to all the receiver facilities, each equipment in this case receiving the totality of the marked audiovisual sequences.

This solution cannot be put into practice for a digital television type distribution for instance, which is supposed to function for thousands or millions of users, the broadcast transmission network not being able to transport such a huge quantity of data because of its physical limitations.

Moreover, such a system would present an important security disadvantage, as a malicious user, having access to all the marked sequences, might assume a false identity or delete the mark.

The second solution would be to generate an audiovisual sequence protected by cryptographic means and to send it towards a plurality of receiver facilities, each equipment being provided with the means which allow it to generate a personalized mark and insert it into the deprotected audiovisual sequence before or during the consumption of said audiovisual sequence.

The disadvantage of this solution is that a malicious user could access the original audiovisual sequence by short-circuiting the system by the recovery of the deprotected and not marked audiovisual sequence after the deprotection phase of said audiovisual sequence and before the phase of insertion of the mark into the audiovisual sequence.

This invention sets out to avoid this drawback by sending a unique datum for all the receiver facilities to a plurality of receiver facilities: the modified stream and the complementary stream.

These two streams are determined on the server in order to allow the reconstitution of an altered audiovisual sequence in relation to the original audiovisual sequence, and different from the latter at determined marking positions according to a first step of watermarking the original audiovisual sequence with a first mark.

The two same streams are accessible on the receiver facilities once they have been distributed by broadcast means by a server.

The modified stream alone does not allow to the user of the receiver equipment the access to the original audiovisual sequence, as the modified stream is inaudible and/or illegible from the point of view of human perception.

The access to the complementary stream does not either allow to the user the access to the original audiovisual sequence, as the audiovisual sequence obtained from the modified stream according to complementary stream always has an altered representation for the human perception, even if it is nearer to the audiovisual representation of the original audiovisual sequence than that of the modified stream alone is.

This process is based on a first set of positions which embed a first mark also called "watermark". The marked audiovisual sequence is determined by any type of watermarking process. This process aims at modifying some data into the audiovisual sequence so that, the content is visually not altered but a first mark is introduced into the sequence.

The set of first positions is given by the watermarking process.

The second main step of the invention is to alter the visual content by modifying a second set of positions. Some parameters of the audiovisual sequence are extracted and replaced by dummy data. A small percentage of the data are thus replaced by dummy data and the set of original data is stored temporarily.

The complementary stream is formed by the first set of positions and the second set of positions, and the original data extracted at said second set of positions.

At the receiver side, the reconstruction is carried out is two steps. The first one is to restore the original data into the modified stream. The audiovisual sequence is then visually acceptable and still embeds the first mark.

The second step is to replace the first mark by a second mark. This is possible by modifying the data at the first set of positions. This modification is driven by an identification parameter pertaining to the receiving equipment.

One can imagine that if a "1" is to be introduced, the data pointed by a position from the first set of positions is incremented by 1. In the same manner, if a "0" is to be introduced, a decrement of the data will carried out.

The resulting audiovisual sequence will then embed data representing of the second mark rather than of the first mark.

Instead of incrementing or decrementing, the process to embed the second mark can simply replace the content by another content.

In order to be able to consume the audiovisual sequence, the user has to generate a second mark which will be used to determine an audiovisual sequence marked by said second mark at said marking positions from said modified stream according to said complementary data contained in the complementary stream.

This marked audiovisual sequence can be personalized for each receiver equipment, which allows to identify the authors of any illicit use of marked audiovisual sequence.

For the same reason, a malicious user trying to recover the original audiovisual sequence would be incapable of doing so, as he at no time disposes of the deprotected and not marked audiovisual sequence, even if he succeeds in short-circuiting the normal operation of the system on its receiver equipment.

According to one embodiment, the step consisting in distributing said marked audiovisual sequence includes a step in which one transmits the marking positions towards said receiver equipment.

This allows to simplify the detection operation of said marking positions on client facilities with limited material resources or software.

Thus, according to the invention, said complementary stream is determined according to said nominal stream and said marking positions.

According to one embodiment of the invention, the step in which a first mark is generated capable of being applied to the initial content at marking positions includes steps in which:
  a content marked by said first mark is generated;
  from the binary point of view said marked content and said nominal content are compared so as to determine said marking positions.

This embodiment has the advantage to allow the use of any watermarking device for marking the nominal content with the first mark.

According to another embodiment of the invention, said marking positions are determined by a watermarking device from said nominal content.

This allows in particular to simplify the step consisting in determining said marking positions by renouncing to compare at the binary level between said marked content and said nominal content.

According to one embodiment of the invention, the step in which one generates the complementary stream comprising said complementary data includes steps in which:
  a complete complementary stream is generated comprising complete complementary digital data, able to allow the reconstruction of the nominal content from the modified content,
  said digital data complementary are determined according to the complete complementary data and to said marking positions.

According to one embodiment of the invention, the step in which one generates the complementary stream comprising said complementary digital data includes:
  a step consisting in extracting, out of said nominal content, the data capable of being marked with said first mark at said marking positions;

a step consisting in determining a protected digital datum by scrambling said data capable of being marked;

a step consisting in generating a protected content from said nominal content by replacing said data capable of being marked by said protected digital datum, said complementary data being determined from said protected content so as to be able to reconstitute said protected content.

Thus, according to the invention, once the two streams (the modified stream and the complementary stream) have been generated, one proceeds to the transmission of said stream towards the receiver equipment.

This transmission step is realized by means of a network connection.

According to one embodiment, said marking positions are also transmitted towards the receiver equipment.

In order to be able to transmit said stream towards receiver facilities not having any network connection, the transmission step of said streams is realized by means of a physical support.

In order to improve the protection of the audiovisual sequence against possible fraudsters, the complementary stream can comprise data relating to the digital rights associated to the nominal audiovisual sequence.

In order to simplify the communication infrastructure used for the distribution of two or three streams towards the user, said streams can be transmitted in the same communication channel or on the same physical support.

In order that possible fraudsters cannot detect the marking and an authorized user will be hampered in the consumption of the marked audiovisual sequence, said marked content is visually and auditorily identical to the nominal content.

In order that a user can have access to certain data of the nominal audiovisual sequence however without being able to consume this sequence in a satisfying way without particular authorization, said nominal audiovisual sequence has a nominal size and in which said modified content has an identical size to said nominal size.

According to one embodiment of the invention, the step in which said marked audiovisual sequence is reconstituted includes a step in which
   one determines a modified and marked stream from said modified stream according to said second mark,
said marked audiovisual sequence being determined by said modified and marked stream according to said complementary stream.

According to one embodiment of the invention, the step in which said marked audiovisual sequence is reconstituted includes a step in which
   one determines a modified and marked datum from said modified stream according to said marking positions and said second mark,
said marked audiovisual sequence being determined by said modified and marked datum according to said complementary stream.

According to one embodiment of the invention, the step in which said marked audiovisual sequence is reconstituted includes steps in which:
   one generates a marked datum containing marked data from said modified stream according to said second mark;
   one determines marked complementary data from said complementary stream according to said marked datum,
said marked audiovisual sequence being determined by said modified stream according to said marked complementary data.

According to one embodiment of the invention, the step in which said marked audiovisual sequence is reconstituted includes steps in which:
   one generates a marked datum from said modified stream according to said marking positions and according to said second mark;
   one determines marked complementary data from said complementary stream according to said marked datum and said marking positions,
said marked audiovisual sequence being determined by said modified stream according to said marked complementary data.

In order to obtain a marked audiovisual sequence which is also personalized, said second mark can comprise a personalization identifier.

This personalization identifier can comprise a unique identifier of said receiver equipment and/or a unique identifier of a user of said receiver equipment, and/or a unique identifier of said marking operation, and/or the date of the consumption attempt, and/or the time information of said consumption attempt.

This then allows a personalization of the marked content according to the identifier chosen, possibly using an identifier database.

The marking according to the invention can thus comprise watermarking and personalization.

According to one embodiment of the invention, the step in which said marked audiovisual sequence is reconstituted includes a step which includes
   a step consisting in extracting the protected data placed at the marking positions in said modified stream, said marking positions being determined by analyzing said modified stream;
   a step consisting in determining the data susceptible to be marked by descrambling starting from said protected data;
   a step consisting in altering said modified stream by replacing, in said modified stream, said data protected by said data susceptible to be marked.

According to another embodiment of the invention, the step in which said marked audiovisual sequence is reconstituted includes a step which includes
   a step consisting in extracting the protected data placed at the marking positions in said modified stream;
   a step consisting in determining the data susceptible to be marked by descrambling starting from said protected data;
   a step consisting in altering said modified stream by replacing, in said modified stream, the protected data by said data susceptible to be marked at said marking positions.

The invention also refers to a system for the distribution of a marked audiovisual sequence from a nominal audiovisual sequence towards a receiver equipment, said nominal audiovisual sequence having a nominal content,
the system comprising:
   means able to determine marking positions where a first mark is to be applied to said nominal content;
   means able to generate a modified stream having a modified content different from said nominal content;
   means able to generate a complementary stream comprising calculated complementary data so that it is possible to reconstitute an altered audiovisual sequence from said modified stream according to said complementary data;
   means able to transmit, towards said receiver equipment, said modified stream and said complementary stream;

in which
said complementary data are calculated according to said marking positions;
said altered audiovisual sequence is different from said nominal audiovisual sequence at said marking positions; and in which the system includes:
means able to generate a second mark different from said first mark;
means able to allow the reconstruction, at the receiver equipment, of said audiovisual sequence marked by the second mark at the marking positions starting from the modified stream according to the complementary data.

According to one embodiment, the means able to generate said second mark are structured so as to realize a marking operation of said complementary stream according to said second mark.

According to one embodiment, the means able to generate a second mark are structured so as to realize a marking operation of said modified stream according to said second mark.

According to another embodiment, the system includes means able to alter the modified stream in order to allow the reconstruction of said marked audiovisual sequence.

BRIEF DESCRIPTION OF THE DRAWINGS

Now several embodiments of the invention are described with reference to the annexed figures in which.

DETAILED DESCRIPTION

In the figures, identical references refer to similar technical elements, unless otherwise stated below.

Now an embodiment of the invention is described with reference to FIG. 1 which shows the overall architecture of a system for the implementation of the process according to the invention.

Figure 1:
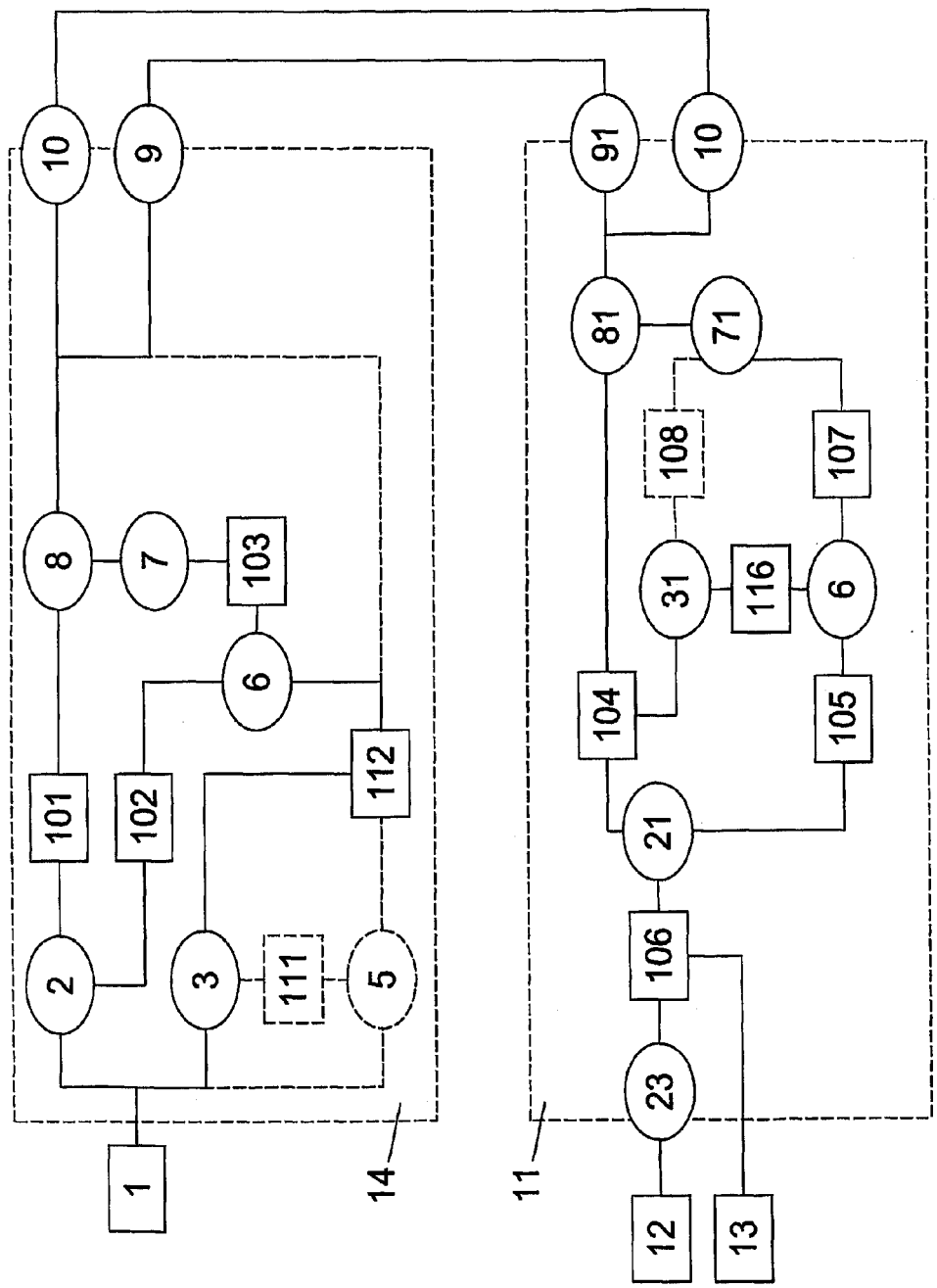
FIG. 1 shows the overall architecture of a system for the implementation of a process according to a first embodiment of the invention.

In FIG. 1, in a server equipment 14, audiovisual content 1 undergoes two main operations.

The initial digital audiovisual stream 1 is sent to an analysis device 2 which uses the characteristics of the audiovisual coding format of the initial audiovisual stream 1 to determine a modified main stream 101 and a complete complementary digital datum 102.

The modified main stream 101 has the same size as the initial stream 1 but has undergone modifications of certain parameters, being thus legible on a standard reader of this size, but the display of the corresponding audiovisual content is not correct from the point of view of human perception.

In the case of the MPEG digital audiovisual standard, the modifications of the initial stream 1 can be: replacement of certain DCT coefficients of certain blocks, substitution of the data about the movement compensation, substitution of the scanning control of the coefficients of certain images, substitution of the quantification parameters etc.

The complete complementary datum 102 extracted in this case only represents about 1% of the data of the modified main stream 101 in order to blur almost totally visually and/or auditorily the original digital audiovisual stream 1.

The modifications done and the possible original data replaced in the modified main stream 101 are stored in the complete complementary digital datum 102 so as to allow a reconstruction of the digital audiovisual stream 1 starting from the modified main stream 101 according to the complete complementary digital datum 102.

The complete complementary datum 102 can thus comprise data (for instance coefficients describing the original digital stream or extracts from the original stream) and functions (for instance, the function replacement or permutation).

A function is defined as containing at least one instruction putting in relation data and operators.

The complementary digital datum 102 describes the operations to carry out to recover the original stream from the modified stream.

The complete complementary datum 102 and the modified main stream 101 can be generated as in the application WO 2004/015996.

In the second analysis step, the initial audiovisual stream 1 is sent to a watermarking device 3 to determine a marked audiovisual stream 111 with a first mark.

This first mark is generated in a generic way in order that its audiovisual representation can be identified, and preferably annoying for the user which would desire to consume the marked audiovisual stream 111.

The extraction device 5 determines marking positions 112 by comparing, at the binary level, the watermarked audiovisual stream 111 and the initial audiovisual stream 1.

The marking positions 112 represent that part of the watermarked audiovisual stream 111 which is different from the initial audiovisual stream 1.

According to an alternative embodiment, the marking positions 112 can be created directly by the watermarking device 3.

A complementary datum 103 is determined by a composition device 6 according to the data placed at the marking positions 112 in the marked stream 111 and according to the complete complementary datum 102.

The composition device 6 first copies the complete complementary datum 102 in the complementary datum 103 and then it inserts the watermarked data of the marked stream 111, placed at the marking positions 112, in the complementary datum 103.

If the marking positions 112 and the complete complementary datum 102 contain references to the same part of the initial audiovisual content 1, the data related to these references in the complementary datum 103 will be replaced by those of the marked stream 111 placed at the marking positions 112.

The complementary datum 103 can comprise data (for instance coefficients describing the original digital stream or extracts from the original stream) and functions (for instance, the function replacement or permutation).

A function is defined as containing at least one instruction putting in relation data and operators.

The complementary datum 103 describes the operations to carry out to recover a part of the original stream.

The complementary datum 103 can comprise the group consisting of the complete complementary datum 102 and the complementary (watermarked data) at the marking positions 112.

The digital size of these two types of information (complete complementary and complementary) is identical, which makes impossible the separation of the complete complementary datum 102 from data watermarked at the marking positions 112, once the complementary datum 103 has been generated.

This functionality brings an important advantage: the separation of the two processes (that of reconstitution of the original stream and that of watermarking) becomes impossible, even for a compromised client station following a successful piracy attempt.

Sending at least one of the two data (complete complementary datum 102 and/or of the marking positions 112) to the audiovisual decoder 11 is protected by one of the protection systems 7 well known by the expert.

The complementary datum 103 is transmitted via the broadcast and transmission network 10 during or before the visualization of said digital audiovisual program 1.

It can also be packed with the greatest part of the modified main stream 101 by the packing device 8, being for instance added to the complementary data or to the metadata of the file including the modified main stream 101.

According to one embodiment, the complementary datum 103 and the marking positions 112 are transmitted together (or separated) via the broadcast and transmission network 10 (9 and 10) during or before the visualization of said digital audiovisual program 1.

A user having the receiver equipment 11 at his home can read all audiovisual content coming from the telecommunications network 10 or coming from the physical support reader 91.

When he wishes to view the modified audiovisual stream 101, he can do so only by recovering the complementary digital datum 102 and possibly marking positions 112.

A demultiplexer 81 transmits, on the one hand, the modified main stream 101 towards a buffer 104 and, on the other hand, the protected complementary datum 103, and possibly the protected marking positions 112, towards a deprotection module 71 compatible with the protection system 7.

The deprotection module 71 transmits the complementary datum 103 unscrambled towards a buffer 107 and possibly the marking positions 112 unscrambled towards a buffer 108, respecting the restrictions imposed by the protection system 7.

A watermarking device 31 generates a second mark and on the fly calculates a marked datum containing marked data at the marking positions 112 from the buffer 104 containing the parts of the modified audiovisual stream 101, said marked datum and said marking positions 112 being sent towards a buffer 116.

Said marked data can be personalized by generating a second different mark for each reading/consumption.

Once the marked datum is inserted into said original stream, the identification of the reading/consumption is possible even if the recomposed stream is subject to piracy attempts of the type re-encoding or analogic or digital capture.

In an alternative embodiment, the watermarking device 31 on the fly calculates a marked datum containing marked data from two buffer memories 104 and 108 which contain the synchronized parts of the modified audiovisual stream 101, respectively the marking positions 112.

The watermarking device 31 uses watermarking techniques equivalent to those used by the watermarking device 3.

A complementary and marked datum is composed on the fly by a composition device 6 starting from two buffer memories 116 and 107 which contain the synchronized parts of the marked datum and its references, respectively that of the complementary datum 103, said complementary and marked datum being sent towards a buffer 105.

The format of the datum contained in the buffer 105 is the same as that of the datum contained in the buffer 107.

A synthesis device 21 recovers on the fly the watermarked audiovisual stream 106 with the second mark from two buffer memories 104 and 105 which contain the synchronized parts of the modified audiovisual stream 101, respectively that of the complementary and marked datum produced by the composition device 6.

The watermarked audiovisual stream 106 is identical to the initial stream 1 from the rendered audiovisual point of view, but it contains an invisible mark detectable by means well known by the expert.

The watermarked audiovisual stream 106 is decoded by the audiovisual decoder 23 and it is rendered to the consumer with the help of the rendering device 12.

Advantageously, the watermarked stream is sent to a recording module 13 for making a private copy of the contents on a physical support such as a DVD, a CD or a memory card.

The general principle of a protection process of an audiovisual stream is exposed hereinafter.

The aim is to authorize the services of video on demand and digital television across all the broadcast networks and the local recording in the memory of the user's digital set top box, the set top box 11 can be a decoder connected to a TV set, a personal computer of the type PC or MAC, a pocket terminal like a phone or also a personal assistant of the type PDA 12.

The solution consists in watermarking, by one or more watermarking algorithms, the complementary datum 103, which is represented by a small part of the audiovisual program 1, this part being primordial for partially listening and/or visualizing said audiovisual program 1 on a display, but it has a very weak volume in relation to the total volume of the digital audiovisual program 1.

Said complementary and marked datum of the audiovisual program 1 is composed by the complementary datum 103 which allows the partial reconstitution of the original stream 1 from the modified stream 101, and the watermarked data containing a second mark in the buffer 116, which allows to mark the contents inaudibly or invisibly.

Thus, the analogic or digital fraudulent copy of such a watermarked contents 106 allows the traceability of the ill-intentioned user by analyzing said second mark.

The modified main stream 101 is freely distributed to the users and among the users physically on every support of the type memory cards, CD, DVD, external memory devices 9 etc. The modified main stream 101 can be read by a classic reading device of this support type like CD-ROM and/or DVD reader, memory card reader 91 etc.

Alternatively, the modified main stream 101 is transmitted via a classic telecommunications or broadcast network 10.

The complementary datum 103 and possibly the watermarking positions 112 are sent to the application via a narrow band telecommunications network 10 like the classic phone networks or the cellular networks of the type cell phone, GPRS or UMTS or using a small part of a network of the type DSL or BLR, or also using a subset of the shared bandwidth on a cable or satellite network.

Thus, the user on his equipment never disposes of the whole of the original audiovisual stream 1 in the digital non protected form, and thus cannot reproduce it illegally. At worst, the user can dispose of the deprotected audiovisual content, but watermarked, which allows the traceability of the copies fraudulently distributed and used.

Advantageously, the complementary datum 103 and possibly the watermarking positions 112 are distributed using the same classic telecommunications or broadcast network 10 or the same physical support 9 as the modified main stream 101.

Advantageously, the complementary datum 103 and possibly the watermarking positions 112 are packed in the modified main stream 101.

According to one particular embodiment, the consumption of an audiovisual content is conditioned by digital rights.

The digital rights represent the datum which specifies the conditions in which a content can be consumed: (a) the number of the comsumptions of the contents, (b) the validity date from which on the contents can be consumed, (c) the date of expiration from which on the contents can no longer be consumed, (d) other types of right, like the domain for which the consumption is allowed, the kind of decoder 23 which allows the consumption, etc.

Advantageously, digital rights on the consumption of the main digital stream are registered by the protection system 7 in the complementary datum 103 or with the protected watermarking positions 112 transmitted to the multiplexer 8.

The complementary datum 103, the watermarking positions 112 as well as the modified main stream 101 can thus arrive indifferently in the receiver equipment 11, together or separately, by the telecommunications network 10 or via a physical support 9 read by the reader 91 of its receiver equipment 11.

Figure 2:
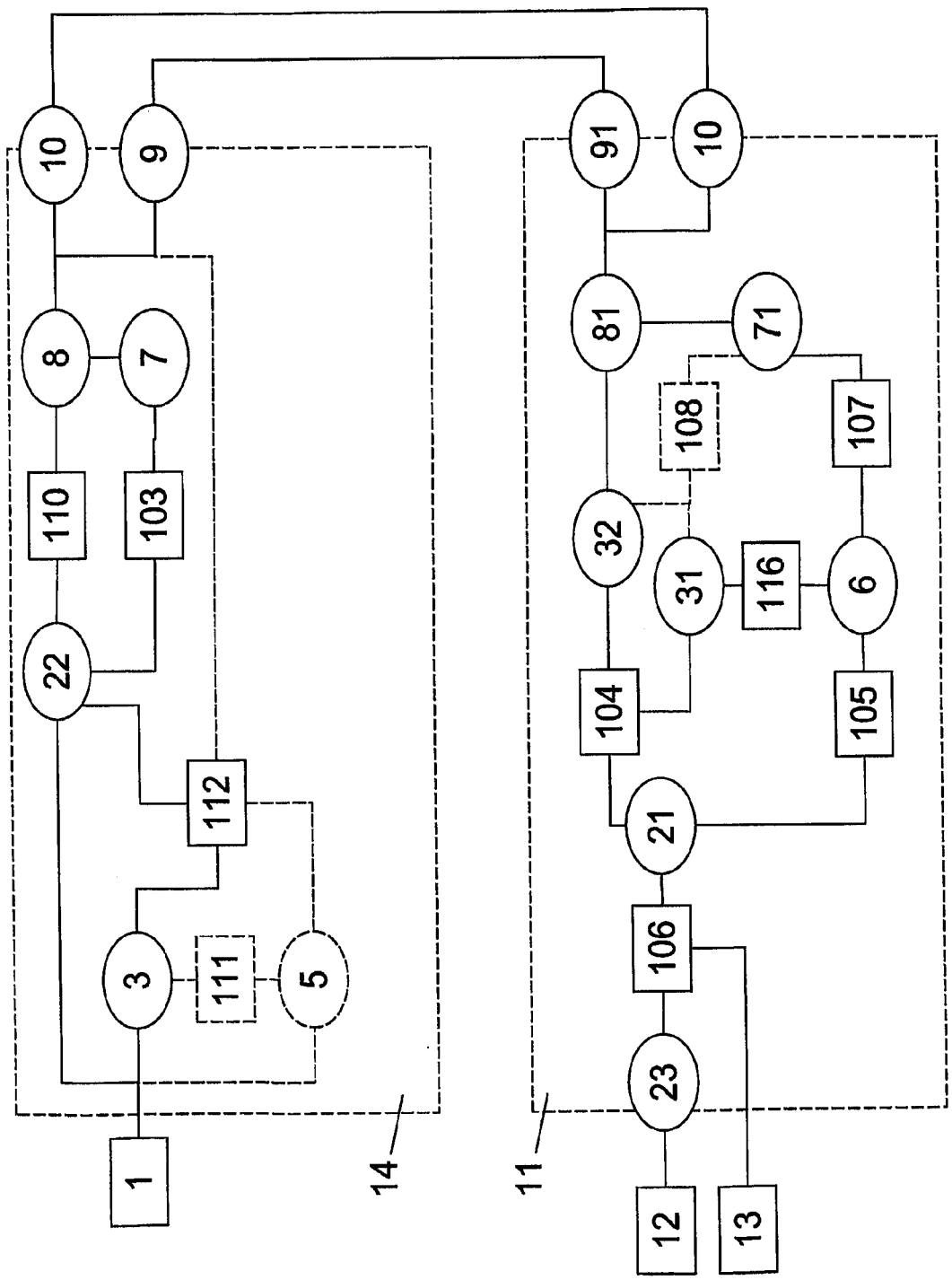
FIG. 2 shows the overall architecture of a system for the implementation of a process according to a second embodiment of the invention.

In a second embodiment with reference to FIG. 2, a modified audiovisual stream 110 is created according to the watermarking positions 112.

In this second embodiment, the analysis device 22 extends the functionality of the device analysis 2 by proposing supplementary steps applied before carrying out the functions of the device analysis 2, steps which consist in extracting, scrambling and replacing the marked datum in the modified stream 110.

This allows to apply the watermarking operation of the audiovisual stream on the client equipment before the reconstitution of the audiovisual stream, and not at the same time, as in the first embodiment.

It has the advantage to increase the security of such a process.

Figure 4:
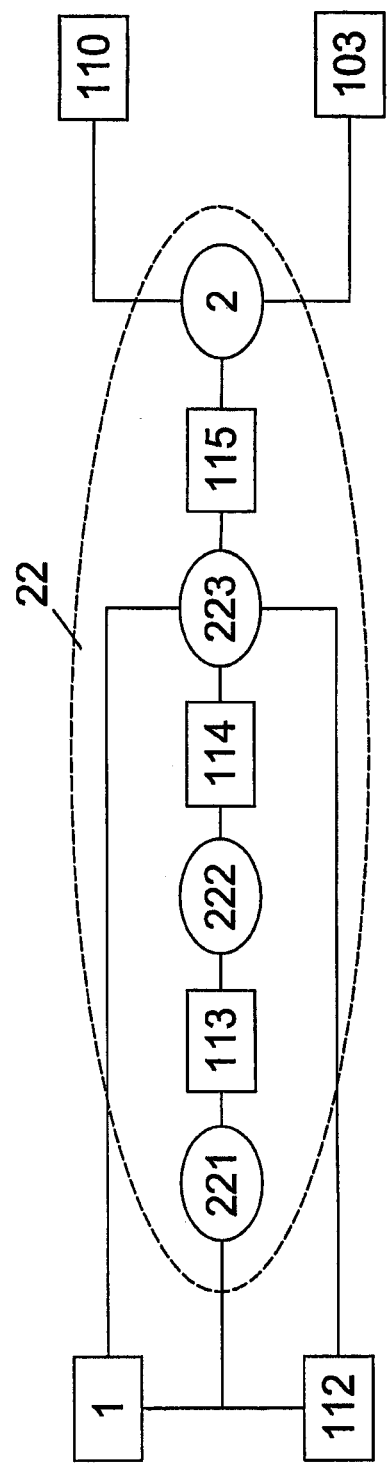
FIG. 4 details a component of the system for the implementation of a process according to the second and the third embodiment of the invention.

The modified stream 110 is generated from the nominal stream 1 according to the watermarking positions 112 by the analysis device 22 by applying the following steps (in reference to FIG. 4):
- a step 221 consisting in extracting from the nominal content 1 the data 113 to be marked with a first mark which are referenced in said nominal content 1 by the marking positions 112;
- a step 222 consisting in determining a protected digital datum 114 by protecting the data to be marked 113 by at least one scrambling operation among those known by the expert;
- a step 223 consisting in generating a protected content 115 by replacing, in the nominal content, the data to be marked 113 by the protected digital datum 114;
- a step consisting in using the analysis device 2 for determining the modified stream 110 and the complementary datum 103 starting from the protected content 115.

According to one embodiment, the parameters used for initiating the scrambling operations according to step 222 (cryptographic keys, type of algorithms etc.) can be sent towards the receiver equipment together with the marking positions.

The modified stream 110 is used in this second embodiment like the modified stream 101 in the first embodiment.

On the receiver equipment, the contents of the buffer 104 is modified by the analysis device 32 before it is used by the watermarking device 31.

Figure 5:
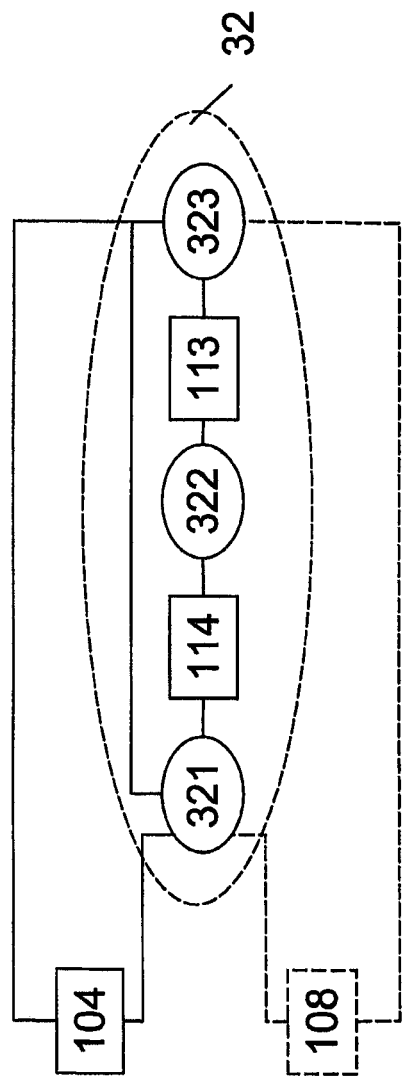
FIG. 5 details another component of the system for the implementation of a process according to the second and the third embodiment of the invention.

In order to do this, the analysis device 32 applies the following steps (in reference to FIG. 5):
- a step 321 consisting in analysing the data contained in the buffer 104 to determine the positions where the data are placed 114 and to extract said data 114 from the buffer 104;
- a step 322 consisting in determining the initial data 113 by performing at least one descrambling operation on the data 114, said descrambling operations have to be conform to those applied according to step 222, the parameters used for initiating said descrambling operations (cryptographic keys, type of algorithms etc.) being recovered in a secure way from a hardware or software module on the receiver equipment;
- a step 323 consisting in modifying the contents of the buffer 104 by replacing the data existing in the buffer 104 by the initial data 113 at the positions determined according to step 321.

According to another embodiment, the analysis device 32 applies the following steps:
- a step 321 consisting in extracting, from the buffer 104, the data 114 placed at the positions referenced by the watermarking positions 112 contained in the buffer 108.
- a step 322 consisting in determining the initial data 113 by performing at least one descrambling operation on the data 114, said descrambling operations have to be conform to those applied according to step 222 and the parameters used for initiating said descrambling operations (cryptographic keys, type of algorithms etc.) being recovered in a secure way from a hardware or software module on the receiver equipment;
- a step 323 consisting in modifying the contents of the buffer 104 by replacing the data existing in the buffer 104 by the initial data 113 at the positions referenced by the watermarking positions 112 contained in the buffer 108.

According to one embodiment, the parameters used for initiating the descrambling operations according to step 322 are recovered by the buffer 108.

Once the operations of the device analysis 32 have been applied, the behaviour of the system is as described in the first embodiment.

Figure 3:
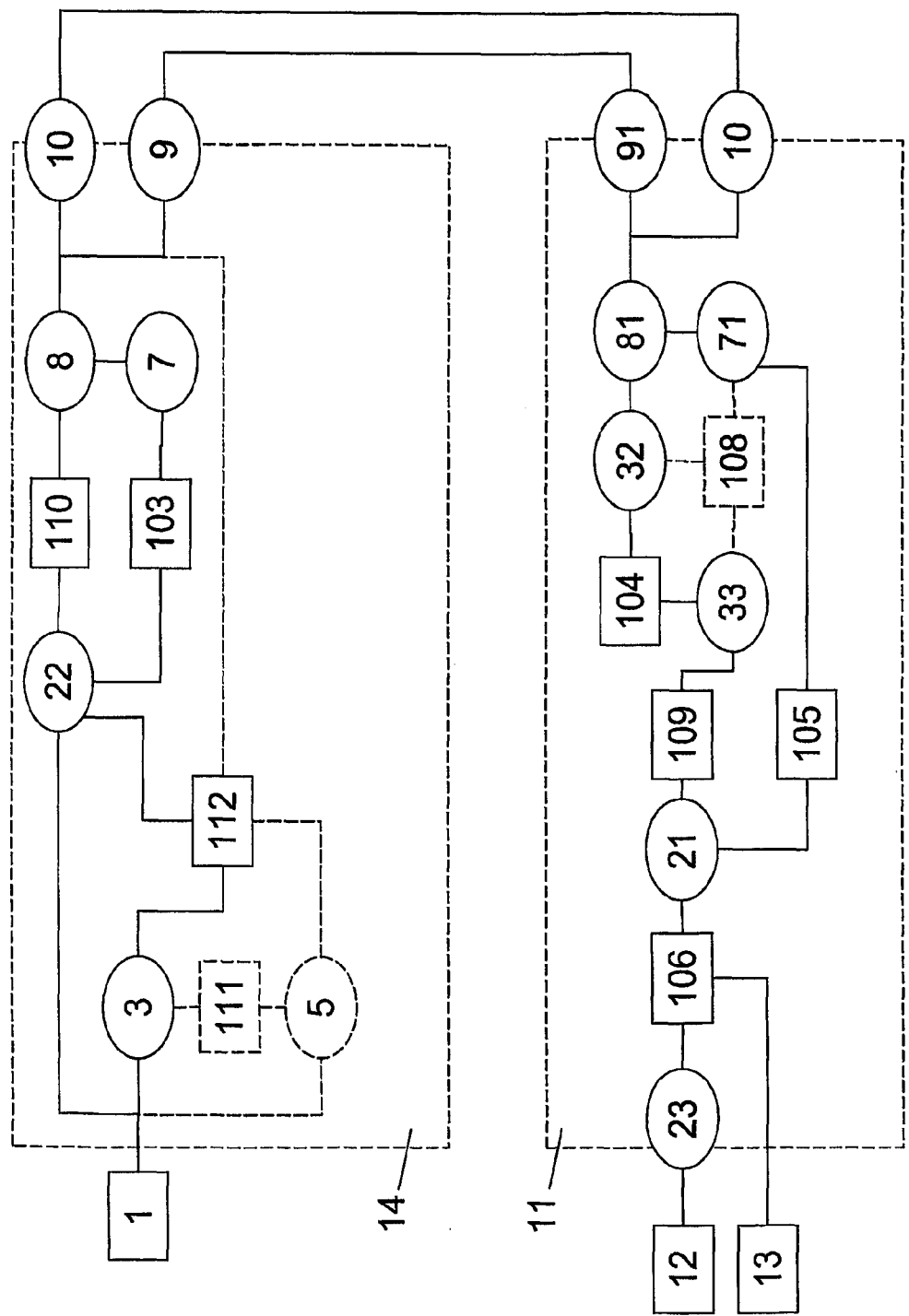
FIG. 3 shows the overall architecture of a system for the implementation of a process according to a third embodiment of the invention.

In a third embodiment with reference to the FIG. 3 annexed, the watermarking device 33 on the fly generates a marked and modified datum from the buffer 104 containing the parts of the modified audiovisual stream 110, said marked and modified datum being sent towards a buffer 109.

According to another embodiment, the watermarking device 33 on the fly generates a marked and modified datum starting from two buffer memories 104 and 108 which contain the synchronized parts of the modified audiovisual stream 110, respectively the marking positions 112, said marked and modified datum being sent towards a buffer 109.

The format of the datum contained in the buffer 109 is the same as that of the datum contained in the buffer 104.

This allows the synthesis device 21 to use the contents of the buffer 109 in the same way as that of the buffer 104 as detailed in the previous embodiments.

The invention claimed is:
1. A process for distributing a modified audiovisual stream towards a receiver, said modified audiovisual stream obtained from an original audiovisual stream comprising:

generating the modified audiovisual content from the original audiovisual content by extracting and replacing original data of the original stream by modified data;

generating a complementary stream containing the original data extracted from the original audiovisual stream;

generating on a server a marked original audiovisual stream by applying an invisible first mark on the original audiovisual stream in a watermarking process, wherein the first mark is common to all receivers and the first mark is applied to data extracted from the original audiovisual stream at at least one marking position;

generating a set of marking positions according to the first mark on a server, wherein the set of marking positions represent differences between the marked original audiovisual stream and the original audiovisual stream;

adding the set of marking positions to the complementary stream by inserting marking data of the marked original audiovisual stream at the marking positions in the complementary stream;

transmitting the modified audiovisual stream and the complementary stream with the set of marking positions towards the receiver wherein, on the receiver, a reconstitution of the audiovisual sequence comprises:

extracting the original data from the complementary stream and replacing the modified data of the modified audiovisual stream by the original data, calculating marking data based on a second mark unique to each receiver and the marking positions extracted from the complementary data, generating an invisibly marked audiovisual stream having the second mark by replacing original data from the modified audiovisual stream by the marking data at the marking positions.

2. The process according to claim 1, wherein a first mark generated to be applied to the initial content at the marking positions comprises:

generating a content marked by the first mark; and comparing, from the binary point of view, the marked content and the original content to determine the marking positions.

3. The process according to claim 1, wherein the marking positions according to the generation of the first mark are determined by a watermarking device from the original content.

4. The process according to claim 1, wherein new complementary data is generated by:

generating recovering complementary data to allow reconstruction of the original content from the modified content at set of positions other than the said marking positions, and generating a marking complementary data according to the complete complementary data and the second mark to allow reconstruction of the marked content from the modified content at the marking positions.

5. The process according to claim 1, wherein the step of determining the complementary stream comprises:

extracting from said nominal content the data to be marked with the first mark at the marking positions;

determining a protected digital datum by scrambling the data to be marked; and generating a protected content from the original content by replacing the data to be marked by the protected digital datum.

6. The process according to claim 1, wherein the step in which the marked audiovisual sequence is reconstituted includes transmitting the marking positions to the receiver.

7. The process according to claim 1, wherein the reconstituted marked audiovisual sequence includes either or both steps below:

determining a modified and marked datum from the modified stream according to the second mark, determining a modified and marked datum from the modified stream according to the marking positions and the second mark, the marked audiovisual sequence being determined by the modified and marked datum according to the recovering complementary data.

8. The process according to claim 1, wherein the reconstituted marked audiovisual sequence includes:

generating a marked datum from the modified stream according to the second mark;

determining marked complementary data from the complementary stream according to the marked datum, the marked audiovisual sequence being determined by the modified stream according to the marked complementary data.

9. The process according to claim 8, wherein the steps of generating a marked datum and determining marked complementary data are performed according to the marking positions.

10. The process according to claim 5, wherein the step in which the marked audiovisual sequence is reconstituted includes:

extracting protected data placed at the marking positions in the modified stream, the marking positions being determined by analyzing the modified stream;

determining the data susceptible to be marked by descrambling from the protected data; and altering the modified stream by replacing, in the modified stream, the protected data by said data susceptible to be marked.

11. The process according to claim 1, wherein the second mark inserted into the marked audiovisual sequence includes a personalization identifier.

12. The process according to claim 1, wherein the marked audiovisual sequence is visually and auditorily identical to the original content.

13. The process according to claim 1, wherein the complementary stream includes data relating to the digital rights associated with the original audiovisual sequence.

14. The process according to claim 1, wherein the modified content has an identical format to a format of the original content.

15. A system for distributing a modified audiovisual stream towards a receiver, the modified audiovisual stream obtained from an original audiovisual stream, the system comprising:

means for generating the modified audiovisual content from the original audiovisual content by extracting and replacing original data of the original stream by modified data;

means for generating a complementary stream containing the original data extracted from the original audiovisual stream;

means for generating a set of marking positions according to an invisible first mark that is common to all receivers and is applied on the original audiovisual stream by a watermarking process wherein the first mark is applied to data extracted from the original audiovisual stream at at least one marking position;

means for adding the set of marking positions to the complementary stream by inserting marking data of the marked original audiovisual stream at the marking positions in the complementary data;

means for transmitting the modified audiovisual stream and the complementary stream with the set of marking positions towards the receiver;

means for generating an invisible second mark different from the first mark;

means for reconstructing at the receiver the audiovisual sequence marked by the second mark at the marking positions from the modified stream according to the complementary data, and wherein the complementary data are calculated according to the marking positions and the altered audiovisual sequence is different from the nominal audiovisual sequence at the marking positions.

16. The system according to claim 15, wherein the means generating the second mark are structured to realize a marking operation of either the complementary or the modified stream according to the second mark.

* * * * *